(12) United States Patent
Nicely et al.

(10) Patent No.: US 9,316,458 B2
(45) Date of Patent: Apr. 19, 2016

(54) ELASTOMERICALLY SELF-GRASPING SPEAR HOLDER FOR UNDERWATER SLING

(71) Applicants: Michael John Nicely, New Smyrna Beach, FL (US); Stephen John Nicely, New Smyrna Beach, FL (US); Travis Carlysle Nicely, New Smyrna Beach, FL (US)

(72) Inventors: Michael John Nicely, New Smyrna Beach, FL (US); Stephen John Nicely, New Smyrna Beach, FL (US); Travis Carlysle Nicely, New Smyrna Beach, FL (US)

( * ) Notice: Subject to any disclaimer, the term of this patent is extended or adjusted under 35 U.S.C. 154(b) by 0 days.

(21) Appl. No.: 14/805,060

(22) Filed: Jul. 21, 2015

(65) Prior Publication Data

US 2016/0061552 A1 Mar. 3, 2016

Related U.S. Application Data

(60) Provisional application No. 62/044,965, filed on Sep. 2, 2014.

(51) Int. Cl.
*F41B 3/02* (2006.01)
*F41B 7/04* (2006.01)

(52) U.S. Cl.
CPC .... *F41B 3/02* (2013.01); *F41B 7/04* (2013.01)

(58) Field of Classification Search
CPC ..................................... F41B 3/02; F41B 7/04
See application file for complete search history.

(56) References Cited

U.S. PATENT DOCUMENTS

| 5,125,388 | A | 6/1992 | Nicely et al. | |
|---|---|---|---|---|
| 7,059,314 | B1 * | 6/2006 | Teague | F41B 3/02 124/20.3 |
| 2012/0037137 | A1 * | 2/2012 | Thurmon | F41B 3/02 124/20.3 |
| 2015/0226512 | A1 * | 8/2015 | Butsook | F41B 5/143 124/20.3 |

* cited by examiner

*Primary Examiner* — John Ricci
(74) *Attorney, Agent, or Firm* — Muncy, Geissler, Olds & Lowe, P.C.

(57) ABSTRACT

An elastomerically self-grasping spear holder for an underwater sling. A cylindrical spear holder has a ring-shaped front part, a solid rear part and a center part containing only two support arms of limited circumferential extent. An elastomeric constrictor placed over the support arms has sides that have a smaller dimension than the diameter of the spear holder. When a spear is placed within the spear holder, the sides of the elastomeric constrictor grip the spear by compression so that the spear is held in position without being held by the operator. The rear part of the spear holder is solid, with a recess on the front surface to receive the rear end of the spear, and a through hole to receive the elastic band connected to a frame.

13 Claims, 4 Drawing Sheets

ELASTOMERICALLY SELF-GRASPING SPEAR HOLDER FOR UNDERWATER SLING

CROSS REFERENCE TO RELATED APPLICATIONS

The present application claims priority of U.S. Provisional Application No. 62/044,965 filed on Sep. 2, 2014 under 35 U.S.C. §119(e), the entire contents of which are hereby incorporated by reference.

BACKGROUND OF THE INVENTION

1. Field of the Invention

The present invention relates to a spear holder for an underwater spear sling and more particularly to an elastomerically self-grasping spear holder for an underwater sling.

2. Description of the Related Art

Underwater spear slings are used for fishing and are a simpler version of the better known powered spear gun, which has a triggering device. In a spear sling, an elastic band is stretched by hand to provide a pushing power to the spear from a rearward direction. It is similar in operation to a bow and arrow arrangement.

In a traditional Hawaiian spear sling shown in FIG. 1 as 10, a cylinder of wood 12 or other material has a central hole 14 along the longitudinal axis with a diameter sufficient to receive a spear 20. An elastic band 16, or cord, is attached to the cylinder to form a loop. The loop has a cup 18 attached thereto in a central position for receiving the rear end of the spear. In operation, the elastic band is pulled back by holding onto the cup and spear with one hand, holding the wood cylinder with the other hand and then releasing the band to eject the spear. The cup is only used to apply pressure to the spear when the band is released and does not hold the spear in position before the release, which must be done by the operator's hand. The operator must exert force to pull the elastic band back and at the same time hold the end of the spear in the cup. It is difficult to do both at the same time with the same hand and to properly aim the device also, all being done underwater.

U.S. Pat. No. 5,125,388 describes another form of spear sling developed by the present inventor. As seen in FIGS. 14-16, a flexible tube 94 is provided to receive a rear end of the spear. However, as described at column 9, lines 5-12, the tube 94 must be gripped by the user at the same time as the propelling tube 80.

While these devices provide workable underwater spear slings for fishing, a problem exists in trying to hold the spear in position at the same time as pulling back the band and aiming the device.

SUMMARY OF THE INVENTION

Accordingly, it is an object of the invention to provide a spear sling which holds the spear in position before it is released.

It is also an object to provide an underwater spear sling which uses a self-grasping arrangement to hold the spear in position before release.

A further object is to provide a self-grasping arrangement for a spear sling using an elastomeric constrictor to provide the grasping.

The present invention provides an elastomerically self-grasping underwater spear sling device that grasps and holds the spear so that the spear does not fall out of the holder when drawn to fire or even if laid down at rest. This is provided by having a spear holder housing made of a front part and a back part separated by a central part formed by support arms. The support arms are covered by an elastomeric constrictor which forms a compressed diameter between the support arms to hold the spear in position.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
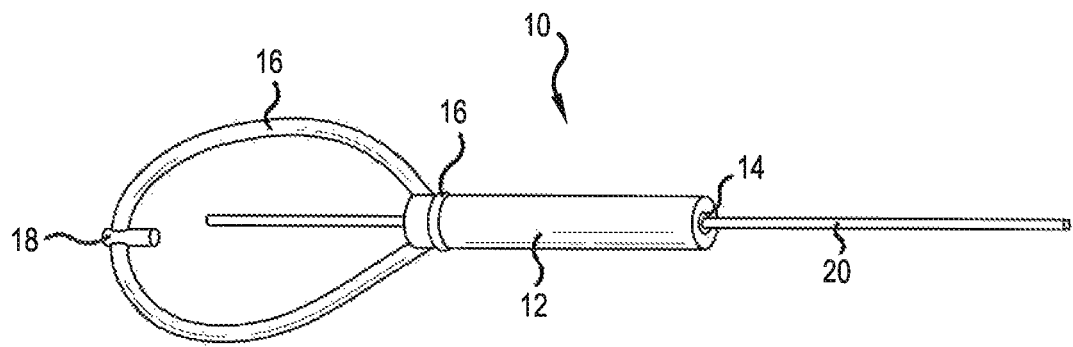
FIG. 1 is a perspective view of a prior art spear sling device.
Figure 2:
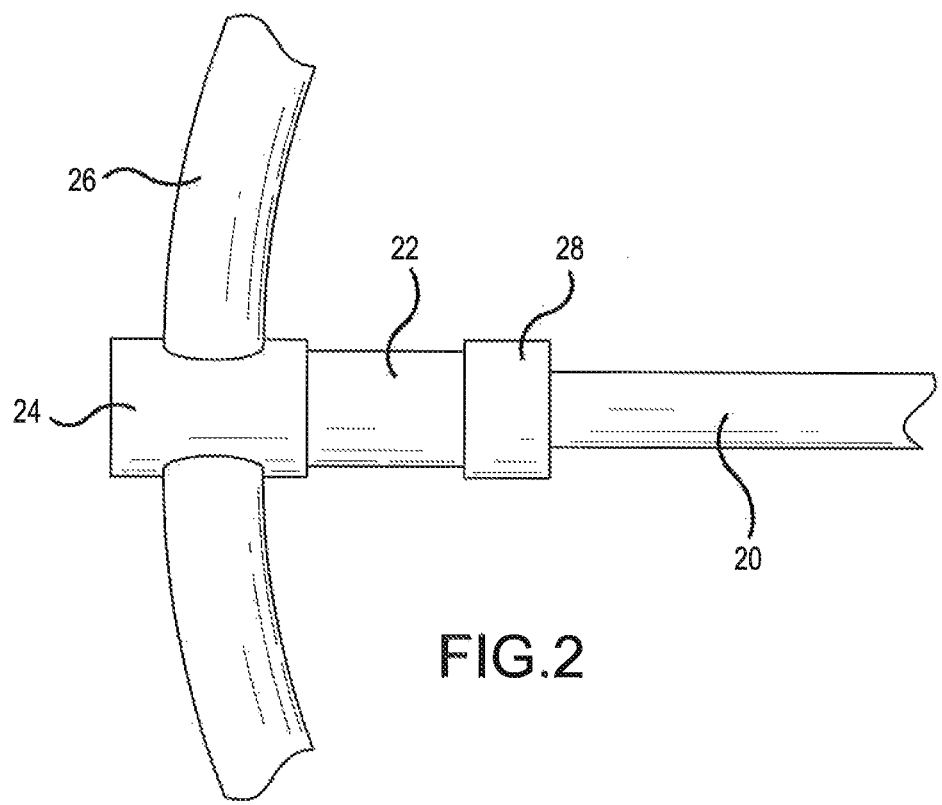
FIG. 2 is a plan view of the spear holder of the present invention with the elastic band and elastomeric constrictor.
Figure 3:
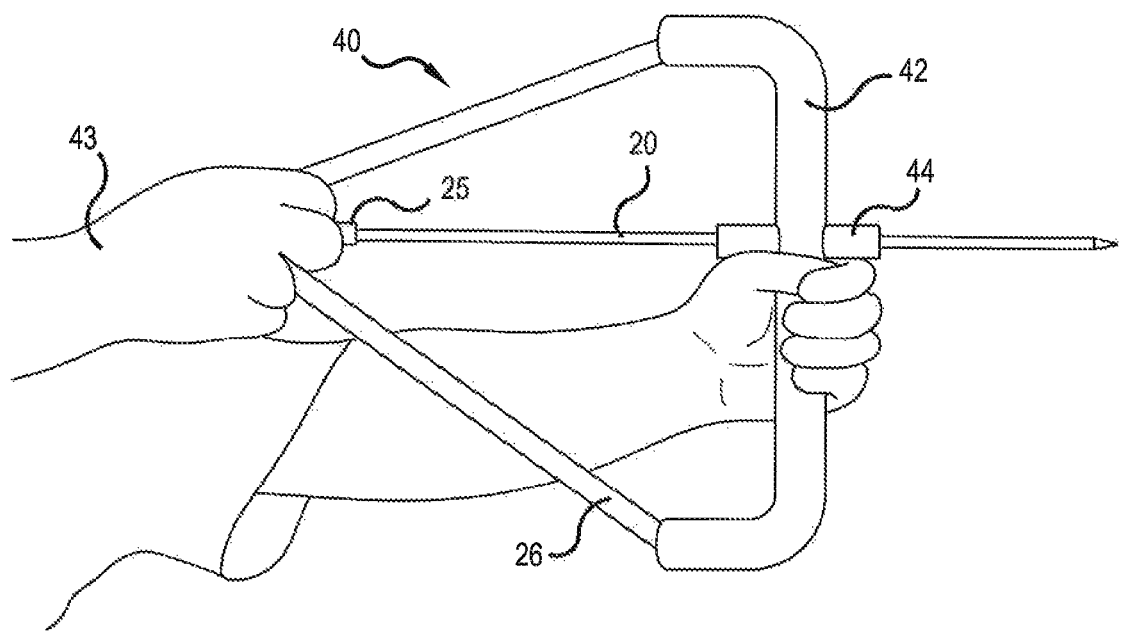
FIG. 3 is a side view of the spear sling of the present invention.

Referring now to the drawings wherein like reference characters designate identical or corresponding parts throughout the several views, and more particularly to FIGS. 2 and 3 which show the underwater spear sling device 40 of the present invention as having a frame member 42 which extends upwardly with perpendicular extensions on each end. The frame member may be made of any strong material, such as wood, plastic or metal. An elastic band 26 is attached to ends of the perpendicular extensions. Alternatively, the band could be connected directly to the vertical part of the frame member. At the center of the frame member, a sleeve 44 is placed in a perpendicular direction and has a central hole along the longitudinal direction to receive a spear 20. The arrangement of the frame member 42, band 26, sleeve 44 and spear 20 is similar to a traditional bow and arrow arrangement and operates in a similar fashion. The operator grasps the band 26 with one hand 43 and pulls backwardly. The frame member is held with the other hand (not shown). The rear end of the spear is held in the spear holder 25, which is held between two fingers of the operator's hand 43. While the frame member is shown in a vertical orientation, it also works in other orientations. The invention could also be used with a traditional Hawaiian spear sling handle shown in FIG. 1 in place of the frame member. Likewise, the invention could be used with other types of frame members or handles. Since this device is designed to have the elastic band pass directly through the rear of the holder, without the use of any other cable or finger protecting tube, it is designed for a traditional underwater spear sling or Hawaiian sling, as opposed to a compound spear sling.

As seen in FIG. 2, the elastic band 26 extends through the rear part 24 of the spear holder 25. The spear holder is partially encased in an elastomeric constrictor 22 near the center of the holder so that it grips the spear any time that the spear is inserted into the spear holder. When an underwater spear 20 is inserted into the spear holder 25, it is held in place by the compression of the elastomeric constrictor 22 that squeezes the spear 20 upon insertion into the spear holder 25. This spear holder will accommodate any of the most commonly used diameter spears, those being ¼" diameter, ⁹⁄₃₂" diameter, and ⁵⁄₁₆" diameter or their close metric equivalents. The ring-shaped front part 28 of the spear holder 25 receives the rear end of the spear 20, which extends completely through the front part. The central part of the spear holder 25 is covered with the elastomeric constrictor 22.

Figure 4:
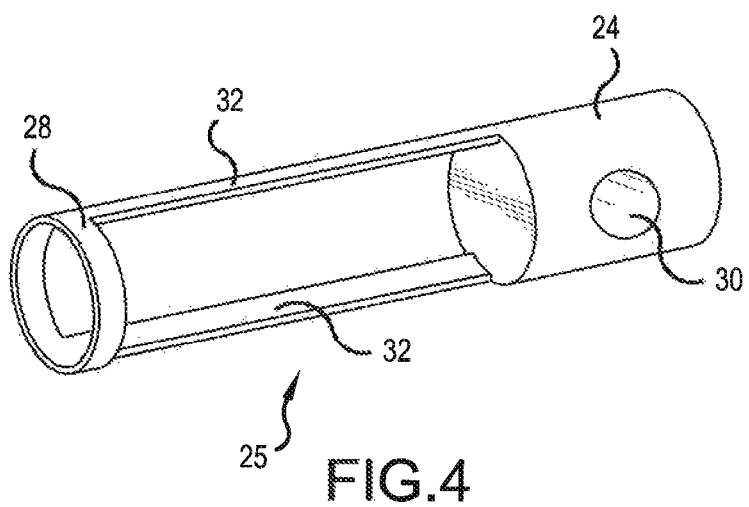
FIG. 4 is a perspective view of the spear holder without the elastomeric constrictor.
Figure 6:
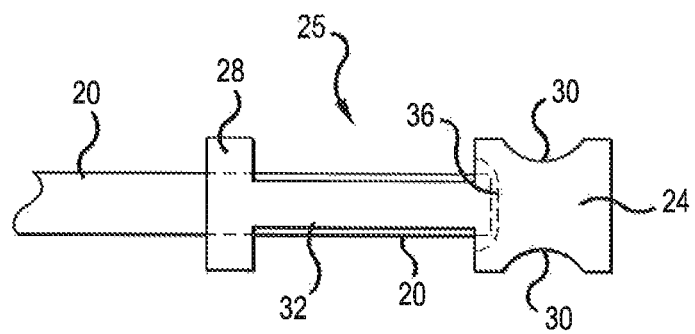
FIG. 6 is a side view of the spear holder of FIG. 4.
Figure 7:
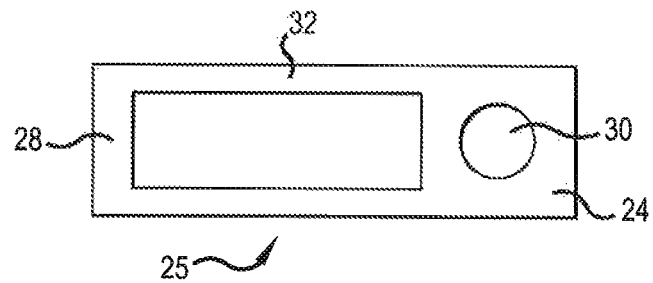
FIG. 7 is a top view of the spear holder of FIG. 4.

FIG. 4 shows the spear holder 25 without the elastomeric constrictor or elastic band. FIGS. 6 and 7 show side and top views, respectively, of the spear holder 25. The front part 28 consists of a hollow ring, with an internal diameter large enough to receive the spear. Normally, the diameter of the ring is larger than the spear diameter, so that it will not slow down the spear upon its release. The rear part 24 is a solid cylinder having a similar outer diameter to front part 28. A hole 30 extends through the rear part to receive the elastic band 26. The hole 30 that passes through the rear portion of the spear holder housing 10 accommodates the elastic band 26 of whatever underwater spear sling is being used. The hole 30 is preferably placed along a center of the sidewall of the rear part, but could be placed off center if desired. The front face of the rear part has a recess 36 (indicated by dotted lines) to receive the rear end of the spear. The recess does not extend backwardly far enough to contact the hole 30 for the elastic band. As seen in FIG. 6, the rear end of the spear, when inserted into the spear holder, extends through the front and center parts, into the recess 36 and contacts the rear surface of the recess. This gives the underwater spear a firm stop upon insertion into the spear holder, without being allowed to touch (or damage) the elastic band 26.

The front and rear parts are connected by a center part consisting of two or more support arms 32. The outer surfaces of the support arms are flush with the corresponding outer surfaces of the front and rear parts. The support arms are present only at a fraction of the circumference of the spear holder, preferably each covering less than 60 degrees of the circumference. The remaining portion of the circumference is empty space. The arms are diametrically opposed and are 90 degrees circumferentially from the hole 30. While it is possible to use more than two support arms or to have arms greater than 60 degrees, their use would allow for less compression of the elastomeric constrictor.

Figure 5:
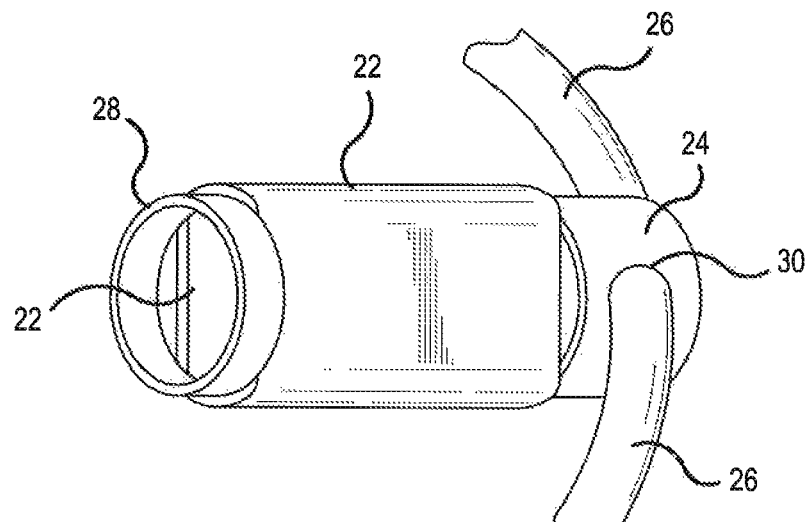
FIG. 5 is a perspective view of the spear holder with the elastomeric constrictor and elastic band.

FIG. 5 shows the spear holder of FIG. 4, with the elastic band 26 and the elastomeric constrictor 22 in place. The elastomeric constrictor is a piece of tubing made of elastomeric material, such as rubber. The diameter of the tubing is smaller than the diameter of the spear holder. The elastomeric constrictor is installed in the central part of the spear holder by stretching it over the front part or over the rear part of the spear holder. It is then slipped toward the central part. When it reaches the central part, it is held outwardly by the support arms, but it contracts inwardly in the remaining portions of the central part. It is this contraction that positions the constrictor to hold the spear in place.

Figure 8:
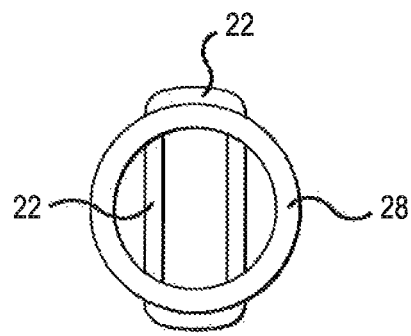
FIG. 8 is a front view of the spear holder of FIG. 4.

FIG. 8 shows a front view of the spear holder. The front part 28 of the spear holder 25 is seen as a hollow ring. The constrictor 22 can be seen through the central opening of the front part 28 as forming straight sides, while the ends of the constrictor extend outside the ring 28. Since the interior diameter of the constrictor lies on the outer surface of the support arms, the ends of the constrictor lie outside and against the outer diameter of the spear holder. The straight sides of the constrictor are unsupported and thus extend from the edge of one support arm to the edge of the other support arm. As a result, the straight sides extend inside the inner diameter of the front part as can be seen in FIG. 8. When the spacing between the straight sides of the constrictor is smaller than the diameter of the spear inserted in the spear holder, the constrictor holds the spear in place by compression without any outside help. This spacing is determined by the circumferential width of the support arms.

Figure 9:
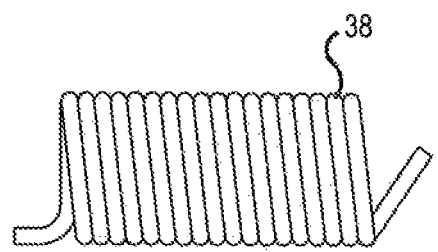
FIG. 9 is a perspective view of an alternative embodiment of the elastomeric constrictor.

FIG. 9 shows an alternative type of elastomeric constrictor, 38. In this embodiment, a cylindrically-shaped spiral is formed from an elastomeric band by winding the band around the support arms. The individual windings then constrict on the spear in a similar fashion to the constrictor formed of an elastomeric tubing. The windings could also be pre-formed into the cylindrically-shaped spiral and slipped over the support arms in the same manner as the installation of the constrictor formed of tubing.

In operation, the operator places the rear end of the spear through the sleeve 44 and into the spear holder, so that it comes to rest in the recess 36 on the front surface of the rear part of the spear holder. The elastic constrictor 22 holds the spear in place by gripping the side of the spear with the sides of the constrictor by compression. While holding the vertical portion of the frame member with one hand, the other hand is used to pull the elastic band back. When the frame member and elastic band extend vertically, the support arms are vertically centered and the elastomeric constrictor has sides in horizontal planes. The operator holds the sling so that the spear holder is between two fingers of the hand that is on the elastic band with the sides of the fingers on the sides of the elastomeric constrictor. It is not necessary to hold the spear in position. When the elastic band is released, the spear is pushed forward by the contraction of the band so that it is propelled through the sleeve and away from the operator. Thus, when the operator is ready to draw and fire the underwater spear sling, he simply assumes what is very similar to a standard archery position, and draws back the band 26, much as an archer would draw back a bow. The spear, being held by the constrictor, is also drawn back.

Additionally, when the spear is drawn back to fire, against the resistance of the spear sling's elastic band, the pressure of the operator's fingers on the constrictor causes the pressure on the spear to be advantageously increased even more so that the spear will be held tighter and not fall out of the spear holder during the drawing back of the sling.

Having the underwater spear sling's elastic band pass directly through the spear holder eliminates the need for any other cables, tubing, etc. in order to draw back the sling. One need only place two fingers on either side of the spear holder, one finger above and another finger below, which positions the fingers between the spear holder and the elastic band, to get a comfortable grip and draw and release.

At rest and during the draw, the pressure of the spear holder's elastomeric constrictor pressing upon the spear is always present. As the spear 20 is drawn back against the resistance of the slinging elastic band 26, it is held even more securely due to the pressure of the slinging elastic band 26 pressing upon the drawing fingers, which press against the elastomeric constrictor 22 which places even more grasping friction upon the inserted spear 20. When the operator wishes to sling the spear, he simply releases the elastomerically self-grasping spear holder 25 (along with the spear 20), thus slinging the spear 20 forward toward the target with great velocity and accuracy.

Further, this self-grasping spear holder allows for easy changing of the size and thickness of the elastomeric constrictor of the spear holder, thus allowing for a very quick and simple adjustment for the user based on how much spear gripping friction he prefers, with whichever spear diameter he is using. Finally, this device allows the underwater spear sling user to maintain a much more traditional vertical archery-like finger, hand, arm, shoulder, and body position while drawing and shooting the underwater spear. This results in more power and better control and aim while shooting a spear with an underwater spear sling.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A spear holder for a spear sling, comprising:
   a front part being a ring and having a first diameter;
   a rear part being a solid cylinder having said first diameter;
   a center part between said front part and said rear part having a partial outer cylindrical surface formed of a plurality of support arms, said partial outer cylindrical surface having said first diameter; and
   a tube-shaped elastomeric constrictor extending over said support arms having sides spaced from each other by a dimension less than said diameter;
   wherein a spear having a second diameter less than side first diameter inserted between said sides of said elastomeric constrictor is gripped by a contraction of the elastomeric constrictor.

2. The spear holder according to claim 1, wherein said rear part has a recess on a front surface and a hole extending transverse to an axis of the cylinder, said recess and said hole being non-intersecting.

3. The spear holder according to claim 2, wherein said spear inserted between the sides of the elastomeric constrictor passes through the front part and abuts the recess of the rear part.

4. The spear holder according to claim 2, wherein the hole receives an elastic band that is capable of slinging the spear.

5. The spear holder according to claim 2, wherein the support arms are 90 degrees circumferentially from the hole.

6. The spear holder according to claim 1, wherein the spear holder is for use with an underwater spear sling.

7. An underwater spear sling, comprising:
   a frame member having a guide for a spear;
   an elastic band for propelling said spear;
   a spear holder, including:
      a front part being a ring and having a first diameter;
      a rear part being a solid cylinder having said first diameter;
      a center part between said front part and said rear part having a partial outer cylindrical surface formed of a plurality of support arms, said partial outer cylindrical surface having said first diameter; and
      a tube-shaped elastomeric constrictor extending over said support arms having sides spaced from each other by a dimension less than said first diameter;
   wherein a spear having a second diameter less than said first diameter inserted between said sides of said elastomeric constrictor is gripped by a contraction of the elastomeric constrictor.

8. The spear sling according to claim 7, wherein said rear part has a recess on a front surface and a hole extending transverse to an axis of the cylinder, said recess and said hole being non-intersecting.

9. The spear sling according to claim 8, wherein said spear inserted between the sides of the elastomeric constrictor passes through the front part and abuts the recess of the rear part.

10. The spear sling according to claim 8 wherein the hole receives an elastic band that is capable of slinging the spear.

11. The spear sling according to claim 7, wherein the support arms are 90 degrees circumferentially from the hole, so that when the frame member is held vertically, the sides of the elastomeric constrictor are horizontal planes.

12. The spear sling according to claim 7, wherein the spear sling is an underwater spear sling.

13. The spear sling according to claim 7, wherein when said elastic band is pulled back by an operator's hand, the spear is also pulled back while being held by the spear holder and pressure from the fingers of said operator's hand on said elastomeric constrictor increases pressure on said spear from the elastomeric constrictor.

* * * * *